United States Patent [19]

Budde et al.

[11] 4,087,536

[45] May 2, 1978

[54] METHOD FOR THE USE OF THIENYLVINYLIMIDAZOLES AS ANTHELMINTICS

[75] Inventors: Paul B. Budde; Robert D. Vatne, both of Midland, Mich.

[73] Assignee: The Dow Chemical Company, Midland, Mich.

[21] Appl. No.: 683,149

[22] Filed: May 4, 1976

[51] Int. Cl.² ............................................. C07D 409/10
[52] U.S. Cl. ................................. 424/273 R; 542/453
[58] Field of Search ............... 260/240 E, 240 A, 309; 424/273

[56] References Cited

U.S. PATENT DOCUMENTS

| | | | |
|---|---|---|---|
| 3,502,661 | 3/1970 | Kasubick et al. | 260/240 E |
| 3,549,624 | 12/1970 | Conover et al. | 260/240 E |
| 3,644,624 | 2/1972 | Conover et al. | 424/251 |
| 3,721,668 | 3/1973 | Rufer et al. | 260/240 A X |
| 4,006,137 | 2/1977 | Haugwitz et al. | 260/240 E X |

FOREIGN PATENT DOCUMENTS 2,035,905   2/1972   Germany ..................... 260/240 E

*Primary Examiner*—Richard L. Raymond
*Attorney, Agent, or Firm*—S. Preston Jones; C. Kenneth Bjork

[57] ABSTRACT

Thienylvinylimidazoles are prepared corresponding to the formula

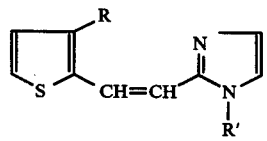

or the pharmacologically acceptable salts thereof wherein R represents hydrogen or methyl and R' represents hydrogen, methyl, ethyl, vinyl or benzyl, with the proviso that R and R' cannot be hydrogen at the same time. These compounds are employed as anthelmintics for the control of gastrointestinal parasites in animals.

15 Claims, No Drawings

METHOD FOR THE USE OF THIENYLVINYLIMIDAZOLES AS ANTHELMINTICS

BACKGROUND OF THE INVENTION

Helminthiasis, the infestation of an animal by certain species of parasitic worms, is one of the most common, serious and widespread animal diseases. Helminthiasis is a serious economical problem in domesticated animals such as swine, sheep, cattle, goats, dogs and poultry. The most common genera of nematodes infecting the animals referred to above are Haemonchus, Trichostrongylus, Ostertagia, Nematodirus, Cooperia, Bunostomum, Oesophagostomum, Chabertia, Trichuris (whipworm), Ascaris, Capillaria, Heterakis and Ancylostoma. Certain of these, such as Trichostrongylus, Nematodirus and Cooperia, attack primarily the intestinal track while others, such as Haemonchus and Ostertagia, are more prevalent in the stomach.

The above parasites during their maturation and growth have a very deleterious effect upon the animal and its rate of growth. In the intestine, and stomach, the parasites erode the epithelial tissues bringing about hemorrhage, anemia, weakness and tissue necrosis. Animals if they do not succumb to gross parasitism, are rendered economically unfit by weakness, lower vitality and poor growth and reproduction. The economic loss to the cattle, sheep and poultry industry of the United States from gross parasitism is extremely high.

While many drugs have been developed to try and offset the effects of these diseases, they have not been completely satisfactory for a variety of reasons. In some cases the drugs have not been sufficiently effective, and in others the cost of the drug has been too high and in many cases the parasites have developed a resistance to the drug.

PRIOR ART

Several compounds have been described as useful in treating helminthiasis. 2-Phenyl benzimidazoles are taught in U.S. Pat. No. 3,080,262. Various 6-substituted-imidazo(2,1-b)thiazoles are taught in U.S. Pat. No. 3,364,112. 2-Thienylmethyl-2-(2-imidazolinyl)sulfide and its salts are taught in U.S. Pat. No. 2,956,923. Substituted 2-[2-(2-thienyl)vinyl]-Δ²-imidazolines and their salts are taught in U.S. Pat. No. 3,644,624.

SUMMARY OF THE INVENTION

The present invention is directed to a method of controlling gastrointestinal nematodes in animals employing as the active anthelmintic agent a thienylvinylimidazole corresponding to the formula

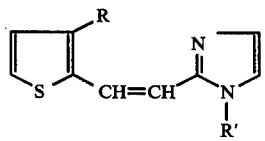

wherein R represents hydrogen or methyl and R' represents hydrogen, methyl, ethyl, vinyl or benzyl with the proviso that R and R' cannot both be hydrogen at the same time and the pharmacologically acceptable salts thereof.

The pharmacologically acceptable salts are the nontoxic acid addition salts of the above bases and include salts such as the hydrochloride, hydrobromide, phosphate, nitrate, sulfate, acetate, citrate, gluconate, benzoate, propionate, butyrate, sulphosalicylate, maleate, laurate, malate, fumarate, succinate, oxalate, tartrate, ammoniate (4,4'-diaminostilbene-2,2'-disulfonate), pamoate (1,1'-methylene-bis-2-hydroxy-3-naphthoate), stearate, 2-hydroxyl-3-naphthoate, hexafluorophosphate, toluene-p-sulfonate, suramin salt, methiodide, methobromide, methochloride and resin adsorbates.

The thienylvinylimidazoles of the present invention are oily materials of low solubility in water and soluble in many common organic solvents and in various mineral acids. The acid-addition salts thereof are crystalline solids which are not very soluble in water or most common solvents.

Representative thienylvinylimidazoles which are useful in carrying out the methods of the present invention include:

1-Methyl-2-(2-(3-methyl-2-thienyl)ethenyl)-1H-imidazole;

1-Methyl-2-(2-(3-methyl-2-thienyl)ethenyl)-1H-imidazole:monohydrochloride;

1-Methyl-2-(2-(2-thienyl)ethenyl)1H-imidazole: monohydrochloride;

1-Methyl-2-(2-(3-methyl-2-thienyl)ethenyl)-1H-imidazole;

1-Methyl-2-(2-(3-methyl-2-thienyl)ethenyl)-1H-imidazole:monotartrate;

2-(2-(3-Methyl-2-thienyl)ethenyl)1H-imidazole: monohydrochloride;

1-Benzyl-2-(2-(3-methyl-2-thienyl)ethenyl)-1H-imidazole:monohydrochloride;

1-Ethenyl-2-(2-(3-methyl-2-thienyl)ethenyl)-1H-imidazole:monohydrochloride;

1-Ethyl-2-(2-(3-methyl-2-thienyl)ethenyl)-1H-imidazole:monohydrochloride;

1-Ethyl-2-(2-(3-methyl-2-thienyl)ethenyl)-1H-imidazole:monohydrobromide;

1-Ethyl-2-(2-(2-thienyl)ethenyl)1H-imidazole;

1-Ethyl-2-(2-(2-thienyl)ethenyl)1H-imidazole: monohydrobromide;

1-Ethyl-2-(2-(2-thienyl)ethenyl)1H-imidazole;

1-Ethyl-2-(2-(2-thienyl)ethenyl)1H-imidazole; benzoate;

1-Benzyl-2-(2-(2-thienyl)ethenyl)1H-imidazole: nitrate; and

1-Benzyl-2-(2-(2-thienyl)ethenyl)1H-imidazole.

The imidazole compounds of the present invention can be prepared by the reaction of an appropriately substituted 2-methylimidazole and an appropriately substituted 2-thiophenecarboxaldehyde in the presence of acetic anhydride.

The reaction can be characterized as follows:

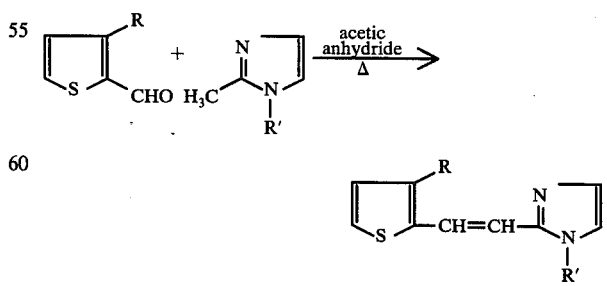

wherein R and R' are as hereinbefore set forth.

In carrying out the above procedure, the aldehyde and imidazole reactants are mixed together in the presence of acetic anhydride and the mixture placed in a reaction vessel connected to a distillation column. The mixture is thereafter refluxed for a period of from about 1 to about 4 hours. During the reaction, the acetic acid by-product, which is formed, and some of the acetic anhydride are distilled off. Periodically, additional acetic anhydride is added and the distillation continued until the temperature is about 160° C. At this point, the refluxing is stopped to prevent excess tar formation and the reaction mixture concentrated under vacuum to remove a substantial amount of the remaining acetic anhydride. The residue thus obtained is mixed with a lower-alkanol such as methanol, ethanol, isopropanol or other such material and the solution concentrated under vacuum. The alcohol appears to convert any remaining acetic acid or anhydride to the corresponding ester thereby preventing excess decomposition in subsequent distillation steps. The concentrated residue is thereafter distilled under reduced pressure and the product is recovered as a liquid. If desired the product can be further purified by a subsequent distillation. If it is desired to obtain the product in its salt form, the appropriate inorganic or organic acid is mixed with the product in a lower alkanol. After such treatment, the salt product is recovered by filtration (the salts are usually recovered as solids), washed with a lower alkanol and dried.

The reactants are consumed in the ratio of one mole of the aldehyde reactant per mole of the imidazole reactant and it is preferred to employ such amounts. The use of a slight excess of the imidazole does not hurt the reaction or decrease appreciably the yield or purity of the product obtained. However, the use of an excess of the aldehyde reactant is not advised as such excess increases the amount of tar formed during the reaction thereby decreasing the product yield.

The practice of the present invention can be accomplished by both the oral and parenteral administration of an anthelmintically effective amount of the hereinabove set forth thienylvinylimidazole compounds. The administration of a therapeutic or prophylactic dose, or dose sufficient to control the nematodes without serious toxic effects on animals, is essential and critical for the practice of the present invention. The exact dose to be administered may vary provided the required anthelmintic dosage is provided and is dependent upon the specific agent to be employed, as well as upon whether the administration is to be made in a single dose or in multiple doses over a period of several days. Where a single dose is employed, good results are obtained when the compounds are administered at a dosage of from about 5 to about 500 milligrams per kilogram of body weight (mg/kg) of the animal and preferably from about 30 to about 300 mg/kg of body weight.

The administration can be carried out by the feeding of the unmodified imidazole compounds. However, the present invention also embraces the employment of a liquid drench, powder, mash, pellet, bolus or other animal feed composition containing the imidazole derivatives. In such usage, the compounds may be modified with one or a plurality of additaments or innocuous ingestible adjuvants such as water, ethanol, skimmed milk, syrups, edible oils, surface active dispersing agents such as the liquid and solid dispersing or emulsifying agents; and edible solid carriers such as edible powders, mineral and vitamin supplements and commercial feeds, concentrates and supplements.

For direct oral administration to animals, both solid and liquid compositions containing from about 1 to about 95 percent by weight of the imidazole derivatives can be employed to supply the desired dosage. Where the compounds are provided as a constituent of the principal food ration, satisfactory results are obtained with food rations containing a minor but effective amount of the imidazole derivatives. The exact amount of the compound to be incorporated in the ration is dependent upon the food consumption and feeding habits of the animals concerned. For best results, it is preferred that the animal receive a dosage of from about 30 to about 300 mg/kg body weight per day. Where the compound is provided as a constituent of feed supplements, good results are obtained with supplements containing from 0.5 to 5 percent by weight of the imidazole derivatives. In compositions to be employed as concentrates, the active agents can be present in a concentration of from 2 to 98 percent by weight.

Liquid compositions containing the desired amount of the imidazole derivatives can be prepared by dissolving the compounds in an edible solvent or oil or by dispersing them in water with the aid of a suitable surface active dispersing agent such as an ionic or nonionic emulsifying and dispersing agent. Suitable surface active agents include the glycerol and sorbitan esters of fatty acids and the polyoxyalkylene derivatives of fatty alcohols and sorbitan esters. The aqueous compositions can contain one or more water-immiscible oils as a solvent for the active agent. In such compositions, the water, oil and emulsifying agent constitute an aqueous emulsion carrier.

In the preparation of solid feed compositions, the imidazole compounds can be mechanically mixed with a finely divided edible solid such as flour or animal feed or a solid surface active dispersing agent such as finely divided bentonite, fuller's earth or attapulgite. These compositions can be administered in the form of bolus, capsule or tablet, or dispersed in an animal feed and such feed used to supply a part of the entire food ration. Alternatively the imidazole compounds can be dissolved in an organic solvent, the resulting mixture dispersed in an animal feed and the feed dried to remove the solvent. Also the compounds can be dispersed in an edible oil such as coconut oil, olive or peanut oil and the resulting mixture dispersed in the feed. These edible oil compositions can contain one of the aforementioned surface active agents.

The finished feed should contain protein, fat, fiber, carbohydrate, vitamins and minerals, each in an amount sufficient to meet the nutritional requirements of the animal for which the feed is intended. Most of these substances are present in naturally occurring feed materials, such as alfalfa hay or meal, cracked corn, whole oats, soybean oil meal, corn silage, ground corn cobs, wheat bran, and dried molasses. Bone meal, limestone, iodized salt and trace minerals are frequently added to supply the necessary minerals and urea to provide additional nitrogen.

As is well known to those skilled in the art, the types of diets are extremely variable depending upon the purpose, type of feeding operation, species, etc. Specific diets for various purposes are listed by Morrison in the Appendix of "Feeds and Feeding," The Morrison Publishing Company, Clinton, Iowa, 1959.

According to the method of the present invention, the thienylvinylimidazoles and/or their non-toxic acid addition salts can be administered parenterally, e.g., by subcutaneous or intramuscular injection, to animals suffering from helminthiasis of various types in a dosage equivalent to from about 30 mg to about 300 mg/kg of body weight. A single injection is generally sufficient but, in the event multiple doses are employed, the injection can be repeated at regular, e.g., monthly, intervals, or more frequently if desired. Vehicles suitable for parenteral injection may be either aqueous such as water, isotonic saline, isotonic dextrose, Ringer's solution, or non-aqueous such as fatty oils of vegetable origin (cotton seed, peanut oil, corn sesame) and other non-aqueous vehicles which will not interfere with the therapeutic efficiency of the preparation and are non-toxic in the volume or proportion used (glycerol, propylene glycol, sorbitol). Additionally, compositions suitable for extemporaneous preparation of solutions prior to administration may advantageously be made. Such compositions may include liquid diluents, for example, propylene glycol, diethyl carbonate, glycerol, sorbitol, etc.; buffering agents, as well as local anesthetics and inorganic salts to afford desirable pharmacological properties.

Administration of these anthelmintic agents in combination with hyaluronidase avoids local irritation. An increase in the rate of absorption of the drug is observed and the pain due to swelling and distention is greatly reduced if not completely eliminated. Hyaluronidase levels of at least about 150 (U.S.P.) units are very effective in this respect. Higher or lower levels can, of course, be used but 150 units per dose appears to give consistently good results as evidenced by the absence of edema and the general behavior of the animal following injection of the drug preparation.

The following examples merely illustrate the invention and a manner by which it can be practiced and are not to be construed as limiting.

EXAMPLE 1

1-Methyl-2-(2-(3-methyl-2-thienyl)ethenyl)1H-imidazole:monohydrochloride

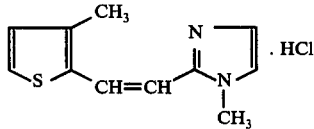

A mixture was prepared by admixing together in a 1.0 liter-3-necked round bottomed flask 144.0 grams (1.5 moles) of 1,2-dimethylimidazole, 189.3 grams (1.5 moles) of 3-methyl-2-thiophenecarboxaldehyde and 450 cubic centimeters (cc) of acetic anhydride. The flask was equipped with a stirrer, thermometer and a 12 foot distillation column. The mixture was stirred and heated at ~150° C. for ~2 hours. The temperature increased to ~160° C. At this time 250 cc of the distillate (mostly acetic acid by-product and acetic anhydride) had been collected. An additional 250 cc of acetic anhydride was added to the reaction flash and the heating continued until the temperature again rose to ~160° C. At this time about 320 cc of the distillate had been collected. The reaction mixture in the flask was thereafter concentrated under vacuum giving a residue of 427.0 grams. This residue was mixed with 500 cc of isopropyl alcohol and the resulting dark colored solution concentrated under vacuum giving a residue of 410 grams. This residue was distilled under reduced pressure. The first fraction (124 grams, boiling at 72°–76° C/0.2–0.4 millimeters of mercury (mm)) consisted mainly of starting material. The main fraction, which was the free base of the desired compound was collected in a yield of 155 grams and boiled at 172°–174° C/0.6 mm. The thick tarry pot residue weighed 115 grams. The main fraction was mixed with 150 cc of ethanol and 150 cc of concentrated hydrochloric acid. The insoluble yellow crystals which formed were filtered, washed with ~1.0 liter of ethanol and dried to give 126.3 grams of 1-methyl-2-(2-(3-methyl-2-thienyl)ethenyl)1H-imidazole:monohydrochloride, (Compound I) melting at 287°–288° C. The product was recovered in a yield of 34.9 percent of theoretical.

By following the procedure set forth in Example 1 and employing the appropriate aldehyde and imidazole reactants, the following compounds are prepared

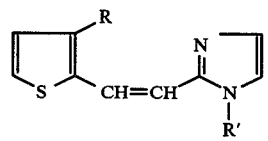

| Compound No. | R | R" | Salt | Boiling point, Melting point or Molecular Weight |
| --- | --- | --- | --- | --- |
| II | —H | —CH₃ | — | MW=190.16 |
| III | —H | —CH₃ | HCl | MP=210°–213° C |
| IV | —H | —C₂H₅ | — | MW=204.18 |
| V | —H | —C₂H₅ | HBr | MW=285.09 |
| VI | —H | —CH=CH₂ | — | MW=202.18 |
| VII | —H | —CH₂φ | — | MW=254.22 |
| VIII | —CH₃ | —H | — | MW=190.16 |
| IX | —CH₃ | —H | HCl | MP=285°–287° C |
| X | —CH₃ | —CH₃ | — | BP=179° C/1.1 mm |
| XI | —CH₃ | —CH₃ | tartrate | MP=158°–160° C |
| XII | —CH₃ | —C₂H₅ | HCl | MP=237°–238° C |
| XIII | —CH₃ | —CH=CH₂ | HCl | MP=197°–198° C |
| XIV | —CH₃ | —CH₂φ | HCl | MP=194°–197° C |

EXAMPLE 2

A study was carried out to determine the anthelmintic efficacy of the hereinafter set forth compounds in the kill and control of *Haemonchus* and other trichostrogylids in sheep.

Test Method:

Sheep which were of the approximate same age and which were naturally infected with the above gastrointestinal nematodes were selected at random to receive, by oral administration, in a single dose, a gelatin capsule containing a predetermined amount of one of the hereinafter set forth compounds.

The efficacy of the compounds was evaluated by comparing the average of two pretreatment counts of eggs per gram of feces and the average of two post-treatment counts of eggs per grams of feces. The pretreatment egg counts were made on days 1 and 2 prior to the administration of the compound and the average of the two counts was employed. The post-treatment egg counts were made on days 6 and 7 after administration of the compound and the average of the two counts was employed.

The results of this comparison, the compounds employed and the dosage administered are set forth below in Table I.

TABLE I

| Compound Number | Milligrams of Compound per Kilogram of Sheep body weight | Percent reduction in egg count per gram of feces |
| --- | --- | --- |
| I | 300 | 98 |

TABLE I-continued

| Compound Number | Milligrams of Compound per Kilogram of Sheep body weight | Percent reduction in egg count per gram of feces |
| --- | --- | --- |
|  | 200 | 100 |
|  | 150 | 97 |
|  | 100 | 96 |
|  | 75 | 100 |
|  | 50 | 54 |
| III | 200 | 100 |
| V | 100 | 63 |
|  | 50 | 50 |
| XI | 100 | 16 |
|  | 50 | 10 |
| XII | 100 | 19 |
| XIII | 100 | 9 |
|  | 50 | 74 |
| XIV | 100 | 13 |

EXAMPLE 3

A study was carried out to determine the anthelmintic efficacy of 1-methyl-2-(2-(2-thienyl)ethenyl)-1H-imidazole:monohydrochloride in the kill and control of *Toxocara canis* in dogs.

Test Method:

A dog which was naturally infected with the intestinal nematode *Toxocara canis* received by oral administration, in a single dose, a gelatin capsule containing 100 mg/kg of the hereinabove set forth compound.

The efficacy of the compound was evaluated by comparing the average of two pretreatment counts of eggs per gram of feces and the average of two post-treatment counts of eggs per grams of feces. The pretreatment egg counts were made on days 1 and 2 prior to the administration of the compound and the average of the two counts was employed. The post-treatment egg counts were made on days 6 and 7 after administration of the compound and the average of the two counts was employed.

The results of this comparison showed an eggs per gram of feces reduction of 69 percent.

EXAMPLE 4

A study was carried out to determine the anthelmintic efficacy of the hereinafter set forth compounds in the kill and control of *Ascaridia galli* in chickens.

Test Method:

Chickens which were of the approximate same age were infected with the intestinal nematode *Ascarida galli*. Following infection, the chickens were held 30 days to permit all worms to mature. The chickens received by oral administration in their feed for four consecutive days a predetermined amount of one of the hereinafter set forth compound.

The efficacy of the compounds was evaluated by comparing the number of ascarids passed in the feces during the first 72 hours after treatment to the number of worms recovered at necropsy which occurs 3 days after treatment.

The results of this comparison, the compounds employed and the dosage administered are set forth below in Table II.

TABLE II

| Compound Number | Milligrams of Compound per kilogram of chicken body weight | Percent worm reduction |
| --- | --- | --- |
| I | 300 | 90 |
|  | 150 | 100 |
|  | 90 | 88 |
| III | 90 | 89 |

TABLE II-continued

| Compound Number | Milligrams of Compound per kilogram of chicken body weight | Percent worm reduction |
| --- | --- | --- |
| X | 200 | 100 |

EXAMPLE 5

A study was carried out to determine the anthelmintic efficacy of 1-methyl-2-(2-(3-methyl-2-thienyl)ethenyl)1H-imidazole:monohydrochloride in the kill and control of *Haemonchus* and other trichostrongylids in sheep.

Test Method:

Sheep which were of the approximate same age and which were naturally infected with the above gastrointestinal nematodes were selected at random to receive, by subcutaneously injection, in a single dose, a predetermined amount of the hereinabove set forth compound.

The efficacy of the compounds was evaluated by comparing the average of two pretreatment counts of eggs per gram of feces and the average of two post-treatment counts of eggs per grams of feces. The pretreatment egg counts were made on days 1 and 2 prior to the administration of the compound and the average of the two counts was employed. The post-treatment egg counts were made on days 6 and 7 after administration of the compound and the average of the two counts was employed.

The results of this comparison and the dosage administered are set forth below in Table III.

TABLE III

| Compound Number | Milligrams of Compound per kilogram of sheep body weight | Percent reduction in egg count per gram of feces |
| --- | --- | --- |
| I | 100 | 94 |
|  | 100 | 98 |
|  | 50 | 86 |
|  | 40 | 34 |

By following the same procedure employing bovine calves as the host animals, a 75 percent reduction in the egg count per gram of feces was obtained at a dosage rate of 100 milligrams per kilogram of bovine calf body weight.

STARTING MATERIALS

The 1-substituted-2-methylimidazoles, -2-thiophenecarboxaldehyde and 3-methyl-2-thiophenecarboxaldehyde employed as starting materials in the present invention are all known compounds which can be obtained commercially or prepared by techniques taught in the known prior art.

What is claimed:

1. A compound corresponding to the formula

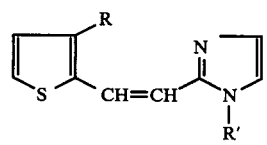

or the pharmacologically acceptable salts thereof wherein R represents hydrogen or methyl and R' represents hydrogen, methyl, ethyl, vinyl or benzyl, with the proviso that R and R' cannot be hydrogen at the same time.

2. A compound as defined in claim 1 wherein R is hydrogen.

3. A compound as defined in claim 1 wherein R is methyl.

4. A compound as defined in claim 1 wherein R' is hydrogen.

5. The compound as defined in claim 3 which is 1-methyl-2-(2-(3-methyl-2-thienyl)ethenyl)1H-imidazole:monohydrochloride.

6. The compound as defined in claim 3 which is 1-methyl-2-(2-(3-methyl-2-thienyl)ethenyl)1H-imidazole.

7. The compound as defined in claim 3 which is 1-methyl-2-(2-(3-methyl-2-thienyl)ethenyl)1H-imidazole:tartrate.

8. An anthelmintic composition comprising an inert carrier and an anthelmintically effective amount of an active compound of the formula

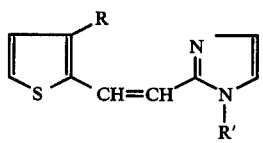

or the pharmacologically acceptable salts thereof wherein R represents hydrogen or methyl and R' represents hydrogen, methyl, ethyl, vinyl or benzyl, with the proviso that R and R' cannot be hydrogen at the same time.

9. The composition as defined in claim 8 wherein the active compound is 1-methyl-2-(2-(3-methyl-2-thienyl)-ethenyl)1H-imidazole:monohydrochloride.

10. The composition as defined in claim 8 wherein the active compound is 1-methyl-2-(2-(3-methyl-2-thienyl)-ethenyl)1H-imidazole.

11. The composition as defined in claim 8 wherein the active compound is 1-methyl-2-(2-(3-methyl-2-thienyl)-ethenyl)1H-imidazole:tartrate.

12. A method for the control of helminthiasis in animals which comprises orally or parenterally administering to said animals an anthelmintically effective amount of a compound corresponding to the formula

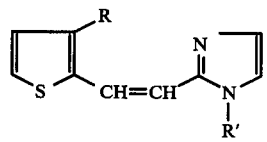

or the pharmacologically acceptable salts thereof wherein R represents hydrogen or methyl and R' represents hydrogen, methyl, ethyl, vinyl or benzyl, with the proviso that R and R' cannot be hydrogen at the same time.

13. The method as defined in claim 12 wherein the active compound is 1-methyl-2-(2-(3-methyl-2-thienyl)-ethenyl)1H-imidazole:monohydrochloride.

14. The method as defined in claim 12 wherein the active compound is 1-methyl-2-(2-(3-methyl-2-thienyl)-ethenyl)1H-imidazole.

15. The method as defined in claim 12 wherein the active compound is 1-methyl-2-(2-(3-methyl-2-thienyl)-ethenyl)1H-imidazole:tartrate.

* * * * *

UNITED STATES PATENT AND TRADEMARK OFFICE
CERTIFICATE OF CORRECTION

PATENT NO. : 4,087,536
DATED : May 2, 1978
INVENTOR(S) : Paul B. Budde and Robert D. Vatne It is certified that error appears in the above-identified patent and that said Letters Patent are hereby corrected as shown below:

Column 1, line 19 "track" should read -- tract --;

Column 2, line 6 "2-hydroxyl-3-naphthoate," should read -- 2-hydroxy-3-naphthoate --;

Column 2, line 42 "1H-imidazole;" should read -- 1H-imidazole: --;

Column 6, line 25, column heading " R" " should read -- R' --.

Signed and Sealed this

Tenth Day of October 1978

[SEAL]

Attest:

RUTH C. MASON
*Attesting Officer*

DONALD W. BANNER
*Commissioner of Patents and Trademarks*